United States Patent

Baker

[15] 3,682,455
[45] Aug. 8, 1972

[54] PIPE BEVELING MACHINE

[72] Inventor: Clarence W. Baker, R.F.D. #2, Grove, Okla. 74344

[22] Filed: June 5, 1970

[21] Appl. No.: 43,774

[52] U.S. Cl. ..................................266/23 NN, 30/97
[51] Int. Cl. ..................................................B23k 7/04
[58] Field of Search ..........266/23 NN, 23 N, 23 M; 166/55; 30/96, 97, 98, 101

[56] References Cited

UNITED STATES PATENTS

| | | |
|---|---|---|
| 2,061,442 | 11/1936 | Summers ...............266/23 NN |
| 2,408,517 | 10/1946 | Howard.............266/23 NN X |
| 1,886,855 | 11/1932 | Wagner.................266/23 NN |
| 1,907,954 | 5/1933 | Gerber..................266/23 NN |
| 2,687,880 | 8/1954 | Waterson..............266/23 NN |

*Primary Examiner*—Frank T. Yost
*Attorney*—James R. Head and Paul H. Johnson

[57] ABSTRACT

A machine for cutting a beveled end on a pipe, the device comprising an arcuate brace for positioning against the outer side of a pipe to be cut, the base being secured around the pipe by a securement chain, the base supporting a manually operated drive mechanism, the drive mechanism supporting a ring wheel, the ring wheel supporting a cutting unit which carries a cutting torch that is angularly adjustable.

4 Claims, 1 Drawing Figure

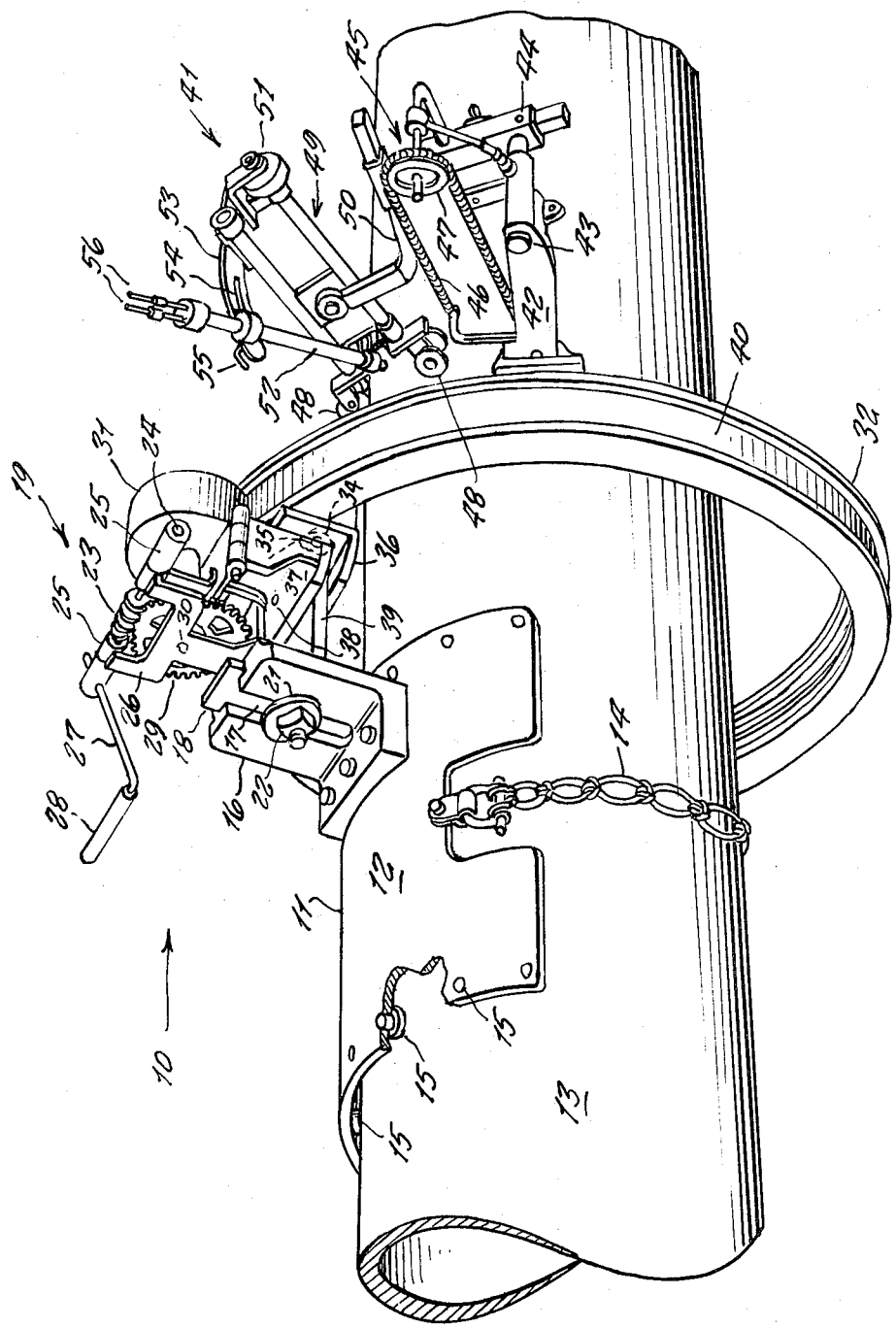
INVENTOR
CLARENCE W. BAKER

PIPE BEVELING MACHINE

This invention relates generally to pipe cutting machines. More specifically the present invention relates to a pipe beveling machine.

A principal object of the present invention is to provide a pipe beveling machine which will precisely bevel a pipe at any desired angle.

Another object of the present invention is to provide a pipe beveling machine which includes a cutting torch that can be angularly inclined respective to the surface of a pipe during a beveling operation so to obtain any desired bevel angle on the pipe end.

Another object of the present invention is to provide a pipe beveling machine wherein the pipe bevel may be cut so to form a pipe end which is either transverse to a longitudinal axial direction of the pipe or wherein the end of the pipe is at a diagonal angle respective to the longitudinal axis of the pipe.

Still another object of the present invention is to provide a pipe beveling machine which includes components whereby the cutting torch may be raised or lowered respective to the pipe being cut.

Other objects of the present invention are to provide a pipe beveling machine which is simple in design, inexpensive to manufacture, rugged in construction, easy to use and efficient in operation.

These and other objects will be readily evident upon a study of the following specification together with the accompanying drawing wherein:

The sole FIGURE comprises a perspective view of the present invention mounted around a pipe being beveled.

Referring now to the drawing in detail, the reference numeral 10 represents pipe beveling machine, according to the present invention, wherein there is a supporting base 11 comprised of an arcuate plate 12 made preferably of steel plate and which is secured around the outer side of a pipe 13 intended to be beveled on one end thereof. The arcuate plate 12 accordingly is clamped around the pipe 13 by means of a chain 14. A plurality of buttons or feet 15 are secured to the under side of the plate 12, the feet comprising preferably rubber pads which bear against the outer side of the pipe so that the base is supported securely in position without shifting due to the frictional grasp of the feet 15. It is of course understood that the plate 12 has accordingly an arcuate curve that corresponds to the outer diameter of a pipe intended to be beveled. Accordingly the present machine may be made adaptable so to be interchangeable with various arcuate curved pipes thereby making the machine suitable for beveling different diameter pipes.

Upon the plate 12 there is mounted a forged metal bracket 16 having a radially extending slot 17 and within which there is supported a radially outwardly adjustable plate 18 to which there is attached a driving mechanism 19. The plate 18 is secured at a desired position upon the bracket 16 by means of a bolt 20 passing through the plate 18 and slot 17 of bracket 16, the bolt 20 then being secured by means of washer 21 and nut 22.

The drive mechanism 19 includes a worm 23 affixed on shaft 24 journaled at its opposite ends in bearings 25 secured to a yoke 26 that is affixed to the plate 18. One end of the shaft 24 protrudes beyond the end of bearing 25 and is connected to a crank arm 27 of a crank handle 28 so that the worm 23 may be rotated. The worm 23 is threadingly engaged with a worm gear 29 secured on shaft 30 supported by yoke 26. The worm gear 29 thus causes a friction wheel 31 secured on the opposite end of the shaft 30 to rotate.

A ring wheel 32 is fitted around the pipe 13 and in spaced relation therefrom, the ring wheel 32 having a circular inner groove 33 on its inner side which rides upon a pair of guide wheels 34 in spaced apart relation and which are supported rotatably free on pins 35 mounted in a bracket 36 which in turn is mounted upon a supporting bracket 37. Bracket 37 is supported pivotally free by means of a pin 38 upon a plate 39 that extends at right angle and integrally from the plate 18. The ring wheel 32 additionally has a track or groove 40 on its outer side and within which the friction wheel 31 travels. Accordingly it will now be noted that the right wheel 32 is supported between the pair of anchor wheels 34 which bear against the inner side of the ring wheel while the friction wheel 31 bears against the outer side thereof. It will now be evident by rotation of crank handle 28 that the ring wheel 32 will thus rotate around the pipe 13.

The ring wheel 32 supports a cutter unit 41. The cutter unit 41 includes a post 42 that is bolted to a side of the ring wheel 32, the post 42 carrying a bar 43 which is held in place by means of a groove in the bar shaft and a set screw 44 that fastens onto the bar.

A spring-loaded mechanism 45 is carried by the bar, including a length of coiled spring of tension type as shown at 46 and which extends around a pulley 47.

The cutter unit 41 further includes a plurality of carrier cages 48 comprised of two wheels and which travel around the outer side of the pipe 13 during a beveling operation. The carrier cages support a structure 49 connected by arm 50 to the spring-loaded mechanism 45. The structure 49 includes an adjustment 51 for the purpose of raising a cutting torch 52 upwardly or downwardly so as to bring the cutting torch 52 relatively closer or further away respective to the surface of the pipe 13. The cutting torch 52 is supported at its upper end by an arcuate arm 53 having an arcuate slot 54 so that the cutting torch can be changed in angle respective to the pipe 13, the cutting torch then being secured to the arm in a set position by means of a locking handle 55. A pair of electrodes 56 at the upper ends of the cutting torch 52 serve for communication with power for the cutting action.

In operative use it will be evident that the ring wheel 32 can be pivoted about the pin so that it will cut a bevel which is either perpendicular to the axis of the pipe 13 or which is diagonal respective thereto at any desired angle. It will be further noted that the cutting torch can be inclined at any angle due to the arcuate slot 54 so that the cut of the torch will be at any perscribed angle as desired.

It is to be noted that originally the present invention was provided with four carrier cages 48 but due to the reason that used pipes have scale over the surface thereof and which may not be cleaned therefrom, the carrier cages have been changed to two wheels instead of four.

Thus there has been provided a pipe beveling machine that is fully adjustable so to cut a bevel at any desired angle or position upon a pipe.

What I now claim is:

1. In a pipe beveling machine, the combination of a base comprising an arcuate plate securable upon a pipe intended to be beveled, said arcuate plate supporting a bracket having a radially extending slot, said slot supporting a drive mechanism, said drive mechanism including a rotatable friction wheel and means to rotate said wheel, a ring wheel encircling said pipe and rotatably supported by said drive mechanism, said ring wheel having a peripheral surface frictionally engaging said friction wheel to be driven thereby, said ring wheel supporting a cutter unit carrying a cutting torch.

2. The combination as set forth in claim 1 wherein said cutter unit includes a spring-loaded mechanism and a carriage attached to said mechanism, said carriage being mounted on a pair of carrier cage wheels, said carriage including an arcuate arm adjustably supporting an outer end of said cutting torch, and an adjustment for raising said torch closer or further respective to said pipe being beveled.

3. In a pipe beveling machine, the combination of a base comprising:
- an arcuate plate securable by a take-up chain around a pipe intended to be beveled;
- said arcuate pipe supporting a forged bracket having a radially extending slot;
- said slot supporting a drive mechanism which in turn drives a rotatable ring wheel;
- said drive mechanism includes a worm engaging worm gear, said worm being mounted on a shaft which at one end is connected to a crank arm carrying a crank handle;
- said worm gear being secured to a shaft which at its other end is secured to a friction wheel which drives against the outer side of said ring wheel;
- said ring wheel supporting a cutter unit carrying a cutting torch.

4. The combination as set forth in claim 1 wherein said cutter unit includes a spring-loaded mechanism and a carriage attached to said mechanism, said carriage being mounted on a pair of carrier cage wheels, said carriage including an arcuate arm adjustably supporting an outer end of said cutting torch, and an adjustment for raising said torch closer or further respective to said pipe being beveled.

* * * * *